United States Patent [19]

Kijima et al.

[11] Patent Number: 4,943,082
[45] Date of Patent: Jul. 24, 1990

[54] VEHICLE SUSPENSION MECHANISM

[75] Inventors: Takao Kijima; Takeshi Edahiro; Toshihide Koyama; Haruyuki Taniguchi, all of Hiroshima, Japan

[73] Assignee: Mazda Motor Corporation, Hiroshima, Japan

[21] Appl. No.: 244,848

[22] Filed: Sep. 15, 1988

[30] Foreign Application Priority Data

Sep. 19, 1987 [JP] Japan .................. 62-235778
Apr. 28, 1988 [JP] Japan .................. 63-105934

[51] Int. Cl.$^5$ .............................................. B60G 7/00
[52] U.S. Cl. ................................. 280/673; 280/690; 280/698; 267/219; 267/293
[58] Field of Search ............... 280/673, 688, 690, 697, 280/698, 699, 700, 701; 267/219, 293, 140.1

[56] References Cited

U.S. PATENT DOCUMENTS

| | | | |
|---|---|---|---|
| 4,132,430 | 1/1979 | Bantle ................................. | 280/673 |
| 4,139,246 | 2/1979 | Mikoshiba et al. ................ | 280/673 |
| 4,616,846 | 10/1986 | Furuya et al. ..................... | 280/673 |
| 4,650,209 | 3/1987 | Sumimoto .......................... | 280/690 |
| 4,717,175 | 1/1988 | Arai et al. ......................... | 280/673 X |
| 4,732,407 | 3/1988 | Oyama et al. ..................... | 267/293 X |

FOREIGN PATENT DOCUMENTS

| | | | |
|---|---|---|---|
| 1043835 | 11/1958 | Fed. Rep. of Germany ...... | 280/688 |
| 3108701 | 9/1982 | Fed. Rep. of Germany ...... | 280/673 |
| 0139807 | 8/1983 | Japan ................................. | 280/688 |
| 60-53408 | 3/1985 | Japan . | |
| 62-55206 | 3/1987 | Japan . | |
| 62-134308 | 6/1987 | Japan . | |

Primary Examiner—Charles A. Marmor
Assistant Examiner—Brian L. Johnson
Attorney, Agent, or Firm—Fleit, Jacobson, Cohn, Price, Holman & Stern

[57] ABSTRACT

A suspension including a swing arm extending in a longitudinal direction of a vehicle and swingably connected with a vehicle body at a joint portion through a connecting member. The suspension comprising a joint structure between the joint portion of the swing arm and the connecting member for allowing a swingable movement of the swing arm in both vertical and horizontal directions relative to the vehicle body and a damping member provided in the connecting member for absorbing a vibration of the swing arm in the longitudinal direction.

7 Claims, 7 Drawing Sheets

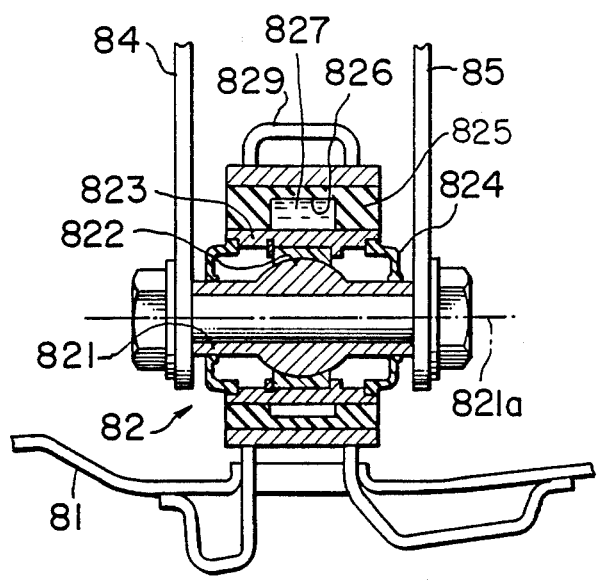
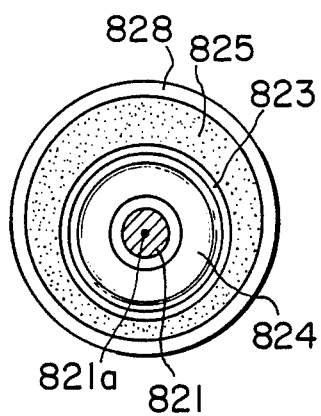
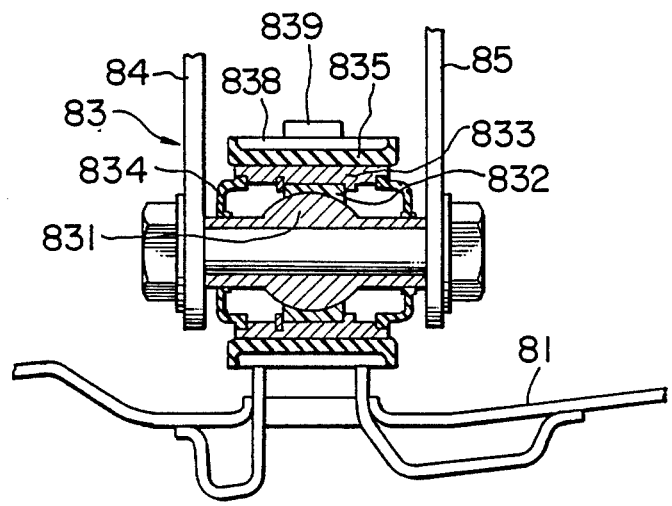

VEHICLE SUSPENSION MECHANISM

BACKGROUND OF THE INVENTION

1. Field of the Invention

The present invention relates to a vehicle suspension mechanism, more particularly to a suspension mechanism provided with a swing arm extending in a longitudinal direction of a vehicle body with the swing arm being connected with the vehicle body.

2. Description of the Prior Art

There has been proposed a vehicle suspension mechanism provided with a swing arm extending longitudinally and a plurality of lateral links extending transversely for carrying vehicle wheels. For instance, Japanese Patent Public disclosure No. 60-53408 discloses a suspension mechanism provided with a swing arm extending longitudinally and swingably connected at the front end portion thereof with a shaft mounted on a vehicle body.

With this structure, the swing arm is subjected to a force which causes the swing arm to displace vertically and horizontally about a joint portion thereof with the vehicle body in bumping and rebounding action of the vehicle. Thus, a resilient property of the joint portion of the swing arm affects a suspension property.

In order to provide the joint portion with a desirable property and an improved durability to thereby obtain a desirable suspension mechanism, Japanese Patent Public Disclosure Nos. 62 55206, laid open to the public on Mar. 10, 1987, and 62-134308, laid open to the public on June 17, 1987 disclose suspension mechanisms in which a joint structure between a swing arm and a vehicle body is provided with a holder member rotatably connected with the vehicle body through a longitudinally extended shaft about which the holder member is rotated and an arm member carried by the holder member for swingably carrying a swing arm in an up and down direction about a shaft mounted on the arm member and allowing the swing arm to displace slightly in the longitudinal direction of the vehicle.

In the joint structures between the vehicle body and the swing arm of the suspension mechanism as disclosed in the prior art aforementioned, there is provided a rubber bushing so as to absorb a vibration transmitted from the vehicle wheels and a torsional force acting on the joint structures.

In this regard, it is necessary for the rubber bushing to have a soft resilient property for accomplishing an improved riding comfort. It should however be noted that a soft property of the rubber bushing is apt to produce a vibration of the vehicle body when a speed change is produced in the vehicle, specifically in an abrupt starting action. This is because such soft rubber bushing allows a delayed movement of the vehicle body relative to the vehicle wheels.

This means that it is difficult to provide a suspension mechanism with a desirable property by merely disposing a rubber bushing at the joint portion between the vehicle body and the swing arm.

Under these circumstances, there is proposed a joint structure having a rubber bushing formed with oil chambers filled with an oil. However, this proposed structure is disadvantageous in that the oil chambers of the rubber bushing are deformed when they are subjected to a torsional force so that a desirable effect cannot be obtained.

SUMMARY OF THE INVENTION

It is therefore an object of the invention to provide a vehicle suspension mechanism which has a desirable resilient property of a joint portion between a vehicle body and a swing arm.

It is another object of the invention to provide a vehicle suspension mechanism which can absorb a vibration of the vehicle wheels effectively to thereby reduce a vibration of the vehicle body.

It is further object of the invention to provide a vehicle suspension mechanism which allows a proper transverse movement of the swing arm.

According to the present invention, in a vehicle suspension mechanism including swing arm means extending in a longitudinal direction of a vehicle and swingably connected with a vehicle body at a joint portion through connecting means, the improvement comprises joint structure means between the joint portion of the swing arm means and the connecting member for allowing a swingable movement of the swing arm means in both vertical and horizontal directions relative to the vehicle body and damping means provided in said connecting means for absorbing a vibration of the swing arm means in the longitudinal direction.

According to features of the present invention, even when a torsional force acts on the swing arm means, the swing arm means can displace so as to absorb the force so that the torsional force is not transmitted to the connecting means. In addition, the damping means functions to absorb a vibration of the swing arm in a fore and aft direction.

The above and other objects and features of the present invention will be apparent from the following description by taking reference with accompanying drawings employed for a preferred embodiment of the present invention.

BRIEF DESCRIPTION OF THE DRAWINGS

FIG. 8(A) is a sectional view of a front bushing structure according to the embodiment of FIG. 6;

FIG. 8(B) is a side view of a front bushing structure according to the embodiment of FIG. 6;

FIG. 9 is a sectional view of a rear bushing structure according to the embodiment of FIG. 6;

DESCRIPTION OF PREFERRED EMBODIMENTS

Figure 1:
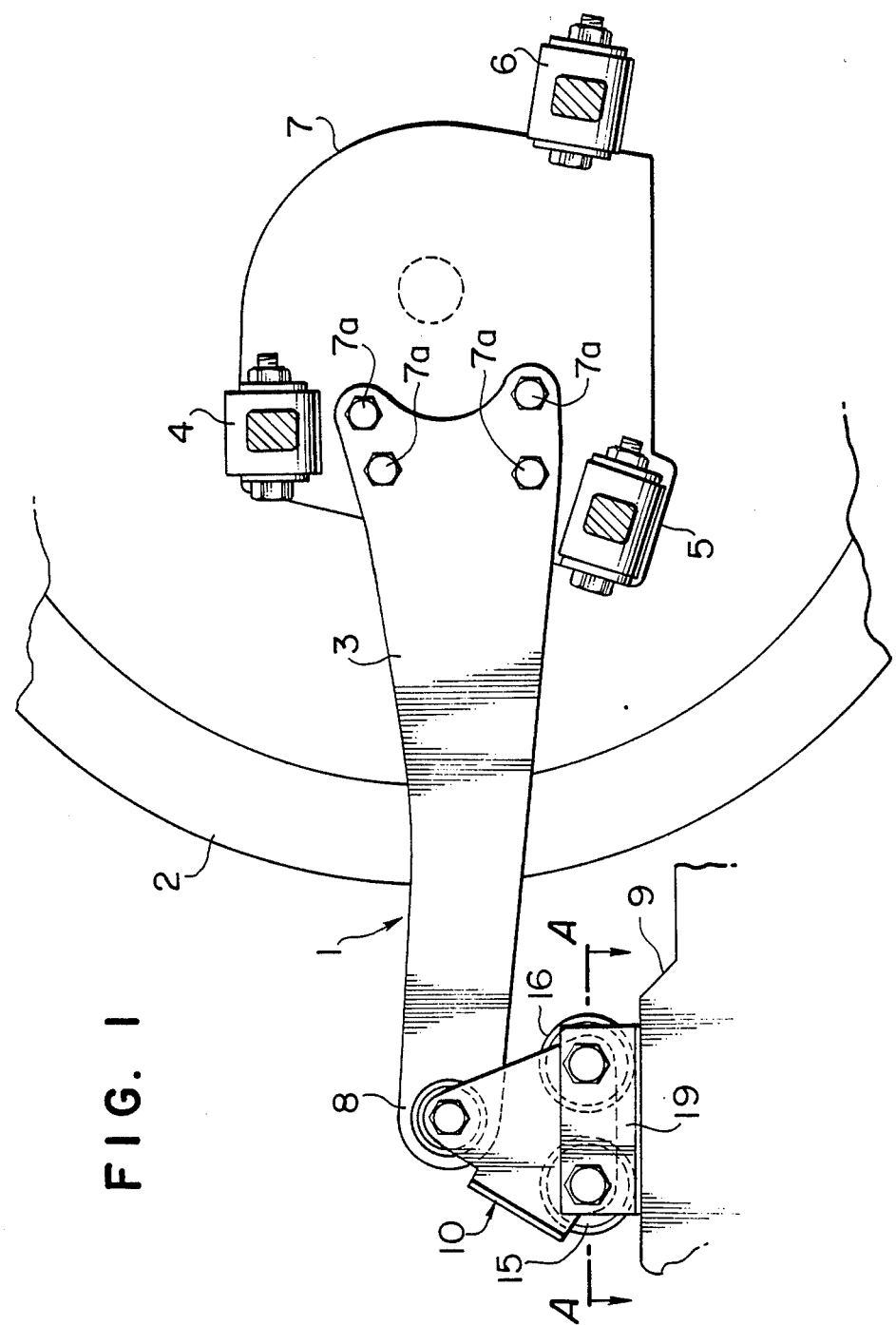
FIG. 1 is an elevational view of a vehicle suspension mechanism in accordance with the present invention.

Referring to the drawings, specifically to FIG. 1, there is shown a suspension mechanism of an automotive vehicle in accordance with the present invention.

Figure 2:
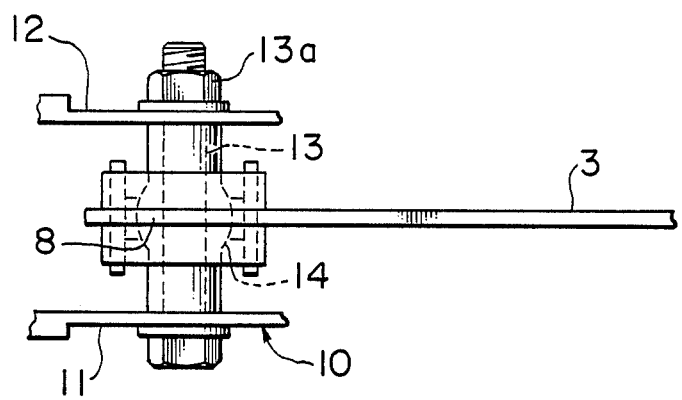
FIG. 2 is a plan view showing a joint portion of a swing arm and a vehicle body.

Each of the suspension mechanisms 1 is symmetrically provided for carrying a left or right rear vehicle wheel 2. Only one of them will be described with reference to the drawings. The suspension mechanism 1 comprises a swing arm 3 extending in a for and aft direction of a vehicle and three lateral links 4, 5 and 6 extending transversely for carrying the wheel 2 through a supporting member 7 which supports a spindle for the wheel 2. A rear end of the swing arm 3 is connected with the supporting member 7 through bolt members 7a. A front end portion of the swing arm 3 is supported with a joint portion structure 8 which is connected with a vehicle body 9 through a connecting member 10. As shown in FIG. 2, the connecting member 10 is comprised of a pair of plate members 11 and 12. On upper portions of the plate members 11 and 12 is mounted a connecting shaft 13 of a joint member, such as a ball joint 14 which is provided for allowing a movement of the swing arm 3 in both vertical and horizontal directions. The connecting shaft 13 of the joint member 14 is joined with the plate members 11, 12 through nut member 13a. The joint portion 8 of the swing arm 3 is engaged with the outer surface of the ball joint 14.

Figure 3:
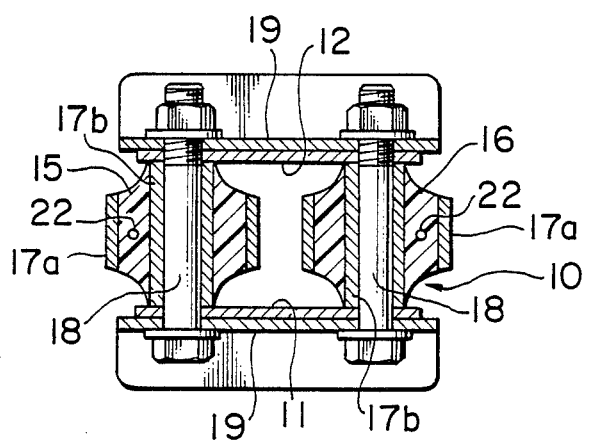
FIG. 3 is a sectional view taken along a line A-A in FIG. 1.

As shown in FIG. 3, there are arranged oil sealed bushings 15 and 16 below the connecting member 10 and at front and rear sides of the connecting member 10. The bushings 15 and 16 are carried between an inner tubular member 17a and an outer tubular member 17b. The bushings 15 and 16 are rotatably mounted together with the inner and outer tubular members 17a and 17b on shafts 18 which are connected with the plate members 11, 12 of the connecting member 10 and a pair of brackets 19 fixed to the vehicle body 9.

Figure 4:
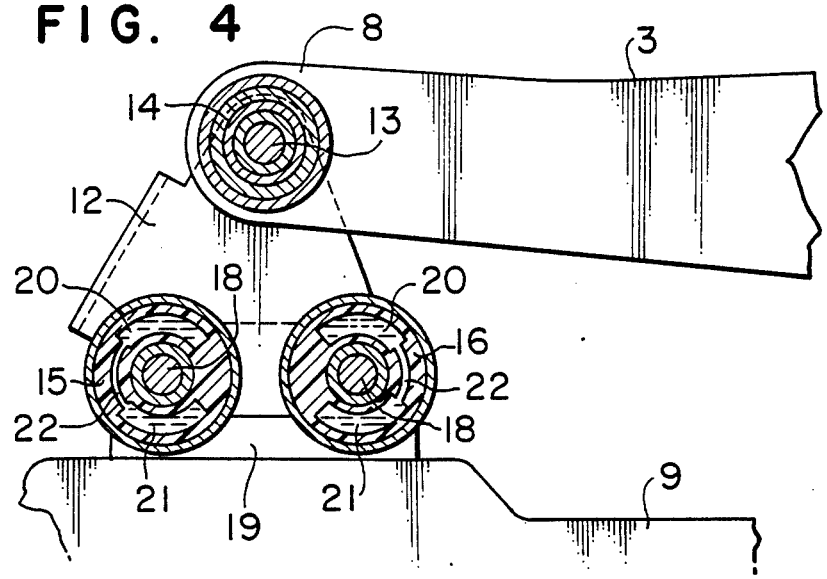
FIG. 4 is a sectional view of bushings of the suspension mechanism.

As shown in FIG. 4, each of the bushings 15, 16 is provided with a pair of oil chambers 20 and 21 disposed in a up and down direction in which an oil is filled and sealed, and an orifice 22 so that the bushings 15, 16 can absorb a vibration of the swing arm 3 in the fore and aft direction.

In operation, when a force is transmitted to the swing arm 3 so as to displace the swing arm 3 forwardly in the case where the vehicle is in a starting operation and the like, the front bushing 15 is subjected to a downward force through the shaft 18 thereof around the shaft 18 of the rear bushing 16 so that the oil in the lower chamber 21 is introduced into the upper oil chamber 20 through the orifice 22 resulting from the compression of the lower oil chamber 21. On the other hand, the rear bushing 16 is subjected to an upward force through the shaft 18 thereof around the shaft 18 of the front bushing 15 so that the oil in the upper chamber 20 is introduced into the lower chamber 21. On the contrary, when the vehicle is in an operation in which the vehicle speed is reduced, the swing arm 3 is caused to displace rearwardly so that the bushings 15, 16 are subjected to forces in the direction opposite to that in the starting operation of the vehicle as mentioned above. In those operations, the orifices 22 resist the oil flow therein to provide the bushings 15, 16 with damping effects for the longitudinal movement of the swing arm 3 respectively.

When the swing arm 3 is subjected to a torsional force, the swing arm 3 can be rotatably displaced to absorb the torsional force acting thereto so that the torsional force is prevented from being transmitted to the bushings 15, 16. This means that the bushings 15, 16 are not deformed because of any torsional force acting on the swing arm 3. Thus, the bushings 15, 16 can provide a desirable damping effect irrespective of the directions of the forces acting on the swing arm 3.

A vibration range of the swing arm 3 in which the damping effect of the bushings 15, 16 can be efficiently obtained changes in accordance with a diameter of the orifice 22, a viscosity of the oil sealed in the chambers 20, 21 and the like. In this regard, the bushings 15, 16 are constituted to have a damping effect which is exerted to absorb the vibration of the swing arm 3 produced in the starting operation and the speed reducing operation. In an abrupt starting operation, the movement of the vehicle wheels 2 might be delayed relative to that of the vehicle body 9 resulting in a vibration of the vehicle. In order to prevent this phenomenon, the bushings 15, 16 are constituted to provide damping properties wherein the damping effects obtained for the forward movement of the swing arm 3 is greater than that obtained for the rearward movement of the swing arm 3.

In the preferred embodiment of the present invention aforementioned, although both the bushings 15 and 16 are formed with the oil chambers 20, 21, one of them can be replaced by an usual rubber bushing which is not provided with the sealed oil.

Figure 5:
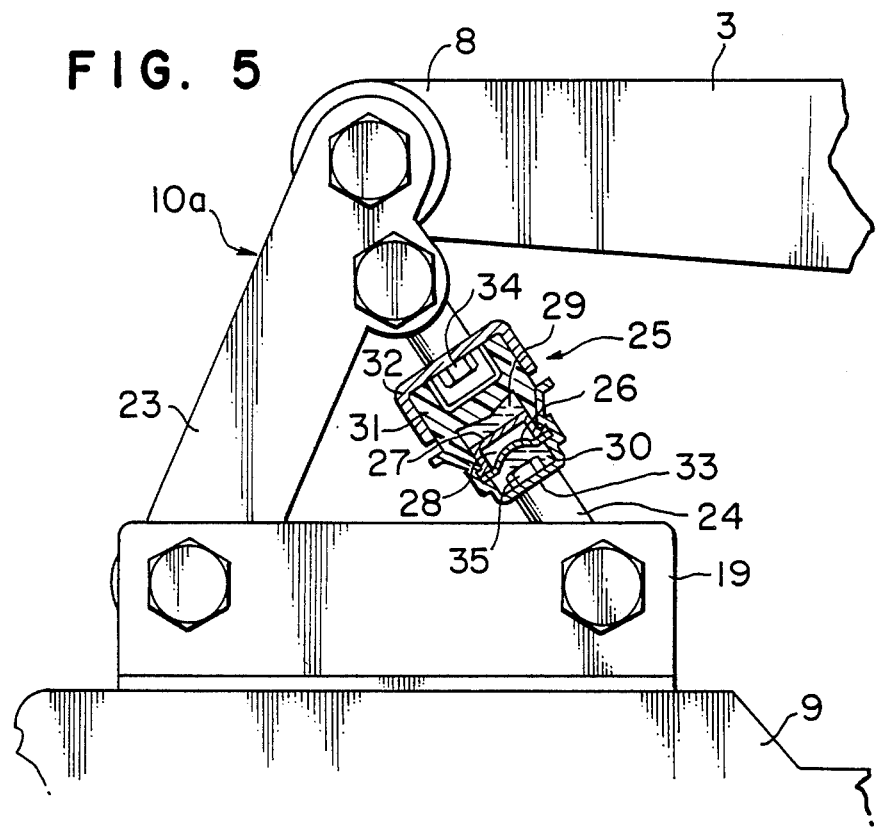
FIG. 5 is a partly sectional view showing a bushing employed in the suspension mechanism in accordance with another embodiment of the present invention.

Referring to FIG. 5, there is shown another embodiment of the present invention. In this embodiment, the suspension mechanism 1 is provided with a first link member 23 connecting the joint portion 8 formed at the front portion of the swing arm 3 with the bracket 19 and a second link member 24 connecting an upper portion of the first link member 23 with the bracket 19 wherein the first and second link members 23 and 24 constitute a connecting member 10a. The second link member 24 is provided with a shock absorber constituted by an oil sealed bushing 25 which comprises a bellows 26, a panel member 27 defining a space 28 and a pair of oil chambers 29, 30 located at the opposite sides of the space with the oil chambers 29 and 30 are communicated with each other through an orifice (not shown). The upper oil chamber 29 is defined by the panel member 27 and a rubber portion 31 which is carried by a bracket 32. A lower end of the rubber portion 31 is carried by a bell-mouthed bracket 33 which also supports the panel member 27 and the bellows 26. The brackets 32 and 33 are connected with the second link 24 through bolt members 34, 35 respectively.

In operation, when the swing arm 3 is caused to be vibrated in the longitudinal direction, the rubber portion 31 and the bellows 26 are deformed so that the oil chambers 29 and 30 are changed in capacity to produce an oil flow between the chambers 29 and 30. As a result, a damping effect can be effectively obtained because of the flow resistance of the oil in the orifice.

Hereinafter there is described still another embodiment in accordance with the present invention.

Figure 6:
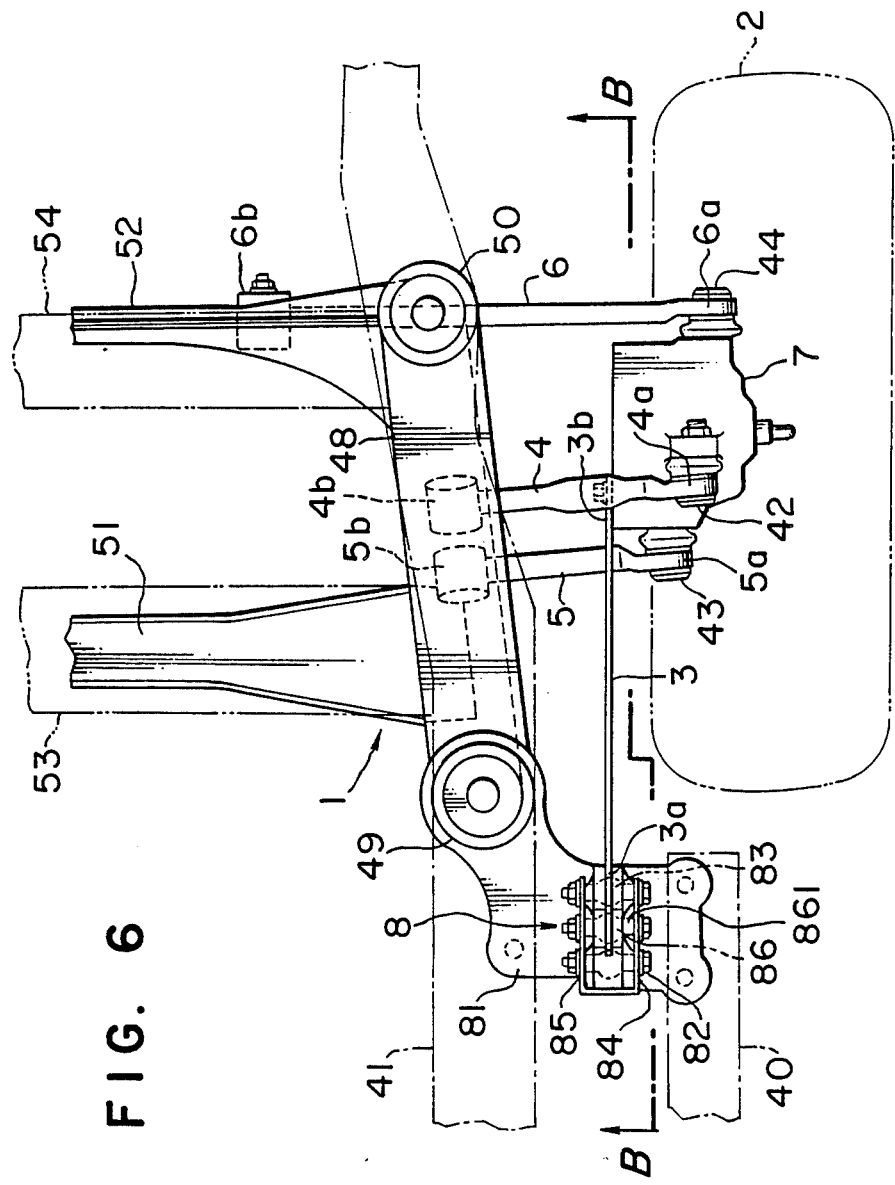
FIG. 6 is a plan view of a suspension mechanism in accordance with the present invention but showing still another embodiment.
Figure 7:
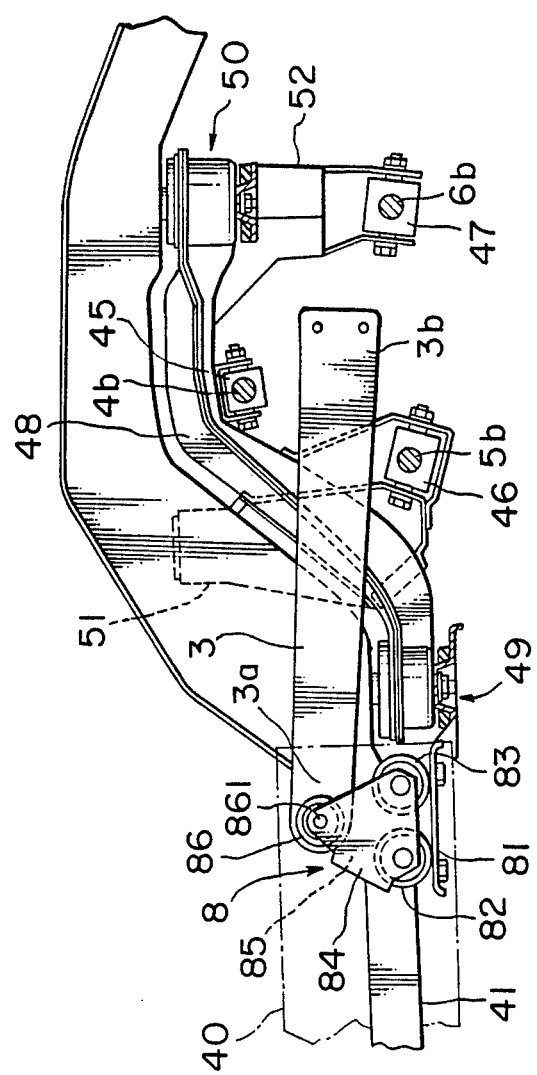
FIG. 7 is an elevational view taken along a line B—B in FIG. 6.

Referring to FIG. 6 and FIG. 7, there are shown a plan view and elevational view of the suspension mechanism according to the embodiment respectively. The suspension mechanism 1 is provided with a swing arm 3 extending longitudinally inside of a vehicle wheel 2 and lateral links 4, 5 and 6 extending transversely. The swing arm 3 of a vertical plate is connected with a side sill 40 of the vehicle body 9 and a side frame 41 disposed inside of the side sill 40 at a front end portion 3a through a joint portion 8. A rear end portion 3b of the swing arm 3 is connected with a wheel supporting member 7 through bolt members and the like. Outer ends 4a, 5a and 6a of the lateral links 4, 5 and 6 are pivotally connected with the supporting member 7 in the up and down direction through rubber bushings 42, 43 and 44. Inner ends 4b, 5b and 6b of the lateral links 4, 5 and 6 are pivotally connected with a sub-frame 48 of the vehicle body 9 in the up and down direction through rubber bushings 45, 46 and 47. The sub-frame 48 extends longitudinally below the side frame 41 and is connected with a lower surface of the side frame 41 at the opposite ends through rubber mountings 49 and 50. The sub-frame 48 is formed with lateral frame portions 51 and 52 extending below and along cross members 53 and 54 disposed transversely.

Now referring to FIGS. 7 through 9, the joint portion 8 is provided with supporting means or bushing structures 82 and 83 which are mounted on an upper surface of a bracket 81 connecting the side sill 40 with the sub-frame 41. The bushing structures 82 and 83 are spaced from each other in the longitudinal direction of the vehicle and extend transversely in parallel with each other. Both ends of the bushing structures 82 and 83 are carried by a pair of triangular brackets 84 and 85. Upper ends of the pair of the triangular brackets 84 and 85 are connected with the front end 3a of the swing arm 3 through an additional supporting means or ball joint 86. The brackets 84 and 85 carry a shaft 861 of the ball joint 86 with the shaft 861 extending transversely. An outer tubular member of the ball joint 86 is rotatably mounted on the shaft 861 with the front end 3a of the swing arm 3 being connected with the tubular member so that the swing arm 3 can swing around the shaft 861.

The bushing structure 82 is of an oil sealed type as shown in FIG. 8(A). The bushing structure 82 is provided with a pillow-ball 821 extending through both the bracket 84 and 85 and joined with the brackets 84, 85 by means of bolt. On an outer surface of a spherical portion of the pillow-ball 821 is rotatably mounted an inner tubular member 823 of a metallic material through a resin ring member 822. A rubber cap 824 is disposed between an outer surface of the pillow-ball 821 and opposite ends of the inner tubular member 823 for sealing.

As shown in FIG. 8(B), a rubber ring 825 is connected with the inner tubular member 823 in a manner that an axis 821a of the pillow-ball 821 is offset from the center of the rubber ring 825 downwardly. In other words, the rubber ring 825 is thickest at the top portion and thinnest at the bottom portion. The rubber ring 825 is provided with a circumferential groove 826 at the inner surface thereof. The depth of the groove 826 is also greatest at the top portion and smallest at the bottom portion. The groove 826 and the inner tubular member 823 define an oil chamber 827 of a rectangle in cross section filled with oil. A metallic outer tubular member 828 is mounted on an outer surface of the rubber ring 825. The bushing structure 82 is mounted on the upper surface of the bracket 81 through the joint bracket 829.

As shown is FIG. 9, the bushing structure 83 is provided with a pillow-ball 831, a resin rubber 832, an inner tubular member 833, rubber ring 835 and an outer tubular member 838 which are disposed in a concentric relationship with one another. There is disposed a rubber cap 834 for sealing between the pillow-ball 831 and the inner tubular member 833. The bushing structure 83 is mounted on the upper surface of the bracket 81 through the joint bracket 839.

With this structure, the front bushing structure 82 can displace largely in the upward direction comparing with the downward direction. On the other hand, the rear bushing structure 83 exerts a same resilient property in any direction and has a harder resilient property than the front bushing structure 82.

In operation, when the wheel 2 is subjected to a bumping and rebounding action, the swing arm 3 swings in the up and down direction around the ball joint 86 since the front end 3a of the swing arm 3 is rotatably mounted on the ball joint 86. In the joint portion 8, the ball joint 86 is carried by a pair of the bushing structures 82 and 83 through the brackets 84 and 85 connected with the vehicle body 9.

Figure 10:
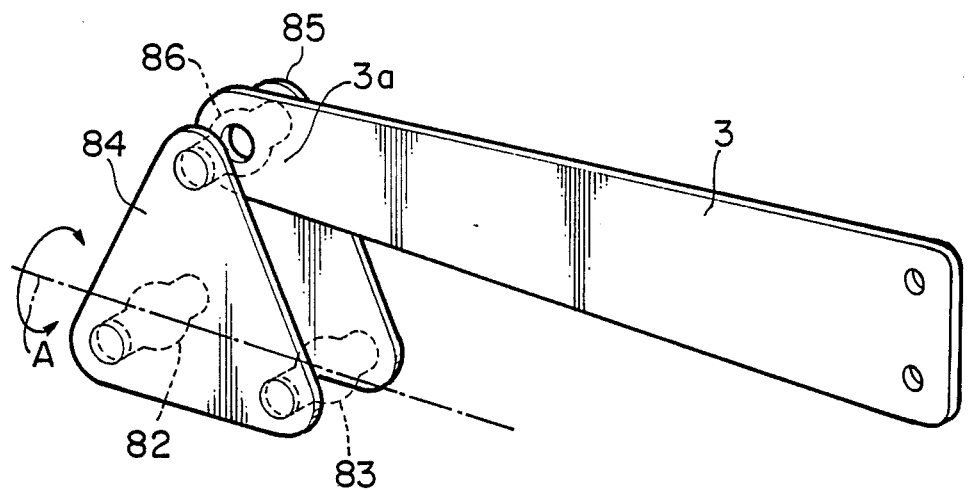
FIG. 10 is a perspective view of a joint portion of a swing arm according to the embodiment of FIG. 6.
Figure 11:
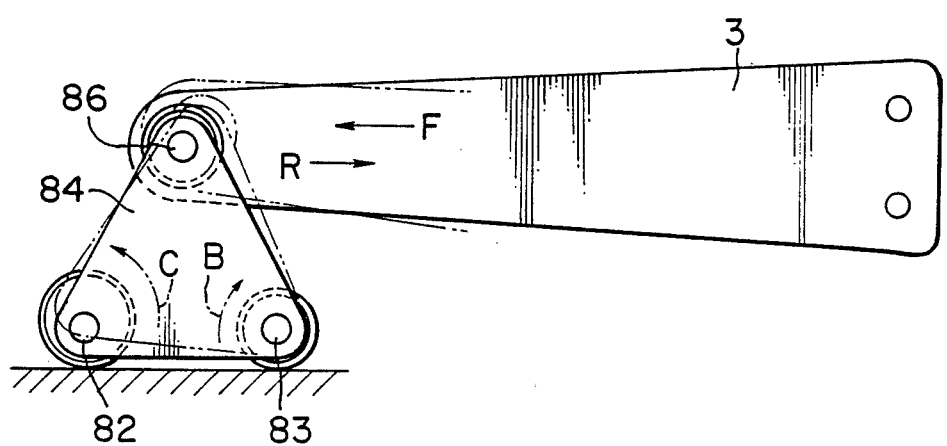
FIG. 11 is a view showing a displacement of link members in the embodiment of the present invention shown in FIG. 6.

As shown in FIG. 10, the ball joint 86 can swing in the transverse direction of the vehicle around a line A passing centers of the pillow-balls 821 and 831. This means that the front end 3a of the swing arm 3 can swing around the line A. When the swing arm 3 is subjected to a longitudinal force R causing the swing arm 3 to displace rearwardly in the case where the vehicle is in a braking operation and the like, the joint portion 8 of the swing arm 3 is caused to move rearwardly as a result of the rotative movement of the brackets 84 and 85 around the rear bushing structure 83 shown by an arrow B in FIG. 11. It should be noted that the front bushing structure 82 is resilient enough to allow the rotative movement of the joint portion 8 in the upward direction as aforementioned in connection with FIG. 8. Thus the bushing structure 82 can absorb efficiently a shock caused by the rearwardly longitudinal force R.

When the swing 3 arm is subjected to a longitudinal force F causing the swing arm 3 to urge forwardly in the case where the vehicle is in an accelerating operation and the like, the joint portion 8 is rotated as shown by an arrow C in FIG. 10 around the front bushing structure 82 in a manner that the upper portion of the brackets 84, 85 move forwardly. It should however be noted that the rear bushing structure 83 is harder than the front bushing structure 82 in the resilient property. Thus, the forward movement of the swing arm 3 is suppressed as small as possible to restrict a vibration caused by the forwardly longitudinal force F. In addition, an anti-diving effect can be obtained in the accelerating operation and the like.

It will be apparent from the above description that many modifications and variations may be made by those skilled in the art without departing from the scope of the claims as attached.

We claim:

1. In a vehicle suspension mechanism including
   swing arm means extending in a longitudinal direction of a vehicle and swingably connected with a vehicle body,
   means for connecting a plurality of lateral link means to extend in a transverse direction of the vehicle, and
   supporting structure means for supporting a front end portion of the swing arm means,
   the improvement comprising:
   a pair of bracket members connected with said supporting structure means in a spaced relationship with each other in a transverse direction of the vehicle,
   first supporting means provided in said supporting structure means and carried by said bracket members for vertically swingably mounting said swing arm means, second supporting means provided in said supporting structure means for swingably carrying said bracket members about a longitudinal axis of the vehicle, said second supporting means having a pair of bushing structures spaced from each other in the longitudinal direction of the vehicle, each of said bushing structures being provided with a pillow-ball member having a spherical portion at a middle portion, said bushing structures extending in the transverse direction of the vehicle and joined with the bracket members at opposite ends, an inner tubular member arranged around the pillow-ball member for rotatably carrying the pillow-ball member, an outer tubular member provided around the inner tubular member through a rubber member, and a joint bracket member for connecting the outer tubular member with the vehicle body.

2. A vehicle suspension mechanism in accordance with claim 1, wherein the first supporting means is comprised of a ball joint.

3. A vehicle suspension mechanism in accordance with claim 1, wherein three lateral link means are provided.

4. A vehicle suspension mechanism in accordance with claim 1, wherein a rear one of said bushing structures is harder than a front one of said bushing structures in a resilient characteristic.

5. A vehicle suspension mechanism in accordance with claim 1, wherein said first supporting means pivotally moves around a rear one of said bushing structures when the swing arm means is subjected to a rearward force.

6. A vehicle suspension mechanism in accordance with claim 1, wherein said first supporting means pivotally moves around a front one of said bushing structures when the swing arm means is subjected to a forward force.

7. A vehicle suspension mechanism in accordance with claim 1, wherein said bracket members are of triangular configuration, said first and second supporting means being joined with corner portions of said bracket members respectively.

* * * * *